April 13, 1948.
M. E. SCHRAMM
2,439,614
FLOW-RATIO METER
Filed Jan. 11, 1945
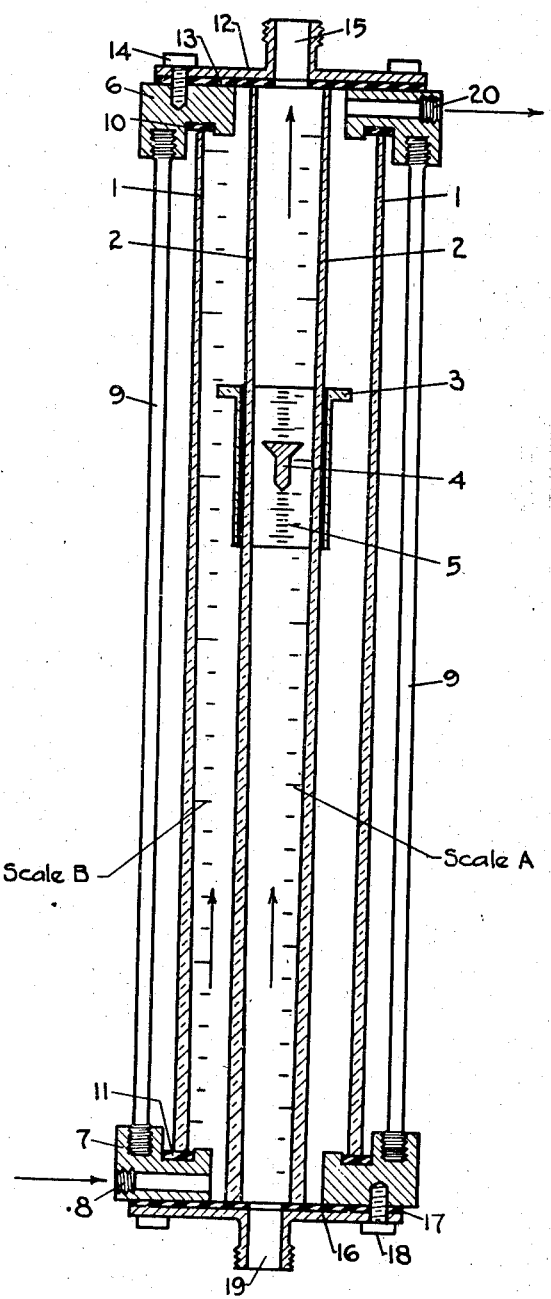
Inventor: Milton E. Schramm
By his Attorney:

Patented Apr. 13, 1948

2,439,614

UNITED STATES PATENT OFFICE 2,439,614

FLOW-RATIO METER

Milton Ernest Schramm, Edwardsville, Ill., assignor to Shell Development Company, San Francisco, Calif., a corporation of Delaware Application January 11, 1945, Serial No. 572,381

7 Claims. (Cl. 73—196)

1

The present invention relates to flow meters and particularly to flow meters of the type wherein the position of a flow-indicating float disposed in a generally upright metering tube indicates the rate of flow of fluid passing through the meter.

Flow meters of this type are generally referred to as rotameters owing to the fact that the free float is often adapted to be rotated by the flow of fluid through the meter. These meters are employed to indicate quantitatively the rate of flow through a conduit or the like, being calibrated in volume/time or weight/time units. For certain purposes, however, it is desirable to utilize an instrument which will indicate the ratio of flow of two fluids, as for example in the evaluation of fuel quality and engine performance an important controlling factor is the ratio of fuel to air introduced into the combustion chamber. Aircraft fuels and aircraft engines are often tested under supercharged conditions with controlled fuel-air ratios. The resistance type exhaust gas analyzers provide a continuous indication of mixture strength, i. e., fuel-air ratio, and have been extensively utilized in the past when accuracy was not a particularly important factor. However, the hydrocarbon composition of the fuel greatly influences the accuracy of these instruments and they are entirely unsuitable for determining mixture strengths wherein the fuel to air ratio is very low.

The method most widely used at present, when accurate fuel-air ratio determinations are required, necessitates the separate determination of fuel consumption and of air consumption and interpolation of these values in order to determine the fuel-air ratio. In this method, fuel consumption is generally obtained by determining the time required for the consumption of a given weight of fuel and air consumption is measured by the pressure drop across a calibrated orifice in the air line. This method is laborious and time-consuming and greatly impedes the determination of test results. Further, this system is obviously impracticable under flight test or commercial operating conditions.

It is an object of the present invention to provide a flow meter arrangement which continuously indicates the flow ratio of two given fluids. A further object is to provide a flow-ratio meter which is suitable for use as a control instrument under laboratory test, road or flight conditions. Another object is to provide a flow-ratio meter operating on the principle of the rotameter which provides a direct measurement of the flow ratio of two fluids, which is accurate at any and all

2 usable fuel to air ratios and which when once calibrated, maintains its accuracy indefinitely.

Further objects, together with some of the advantages to be derived in utilizing the present invention, will become apparent from the following detailed description thereof, taken together with the accompanying drawing forming a part of the specification and illustrating, in sectional elevation, a flow-ratio meter according to the invention.

Referring to the drawing, an outer rotameter tube 1 is provided with an internal taper in the conventional manner and seats at opposite ends on gaskets 10 and 11 which are in turn seated against headpiece elements 6 and 7 respectively. A plurality of staybolts as at 9 threadably engage headpiece elements 6 and 7 and are circumferentially disposed around rotameter tube 1, serving to tighten gaskets 10 and 11 against the ends of rotameter tube 1. A second and smaller rotameter tube 2 having a uniform outside diameter and tapering inside diameter is disposed within rotameter tube 1. Endplate 12 is secured to headpiece element 6 by means of a plurality of threaded bolts as at 14, gasket 13 providing a fluid seal between endplate 12 and headpiece element 6 and also providing a seat for the upper end of rotameter tube 2. Similarly, endplate 16 is secured to headpiece element 7 by means of bolts as at 18 and in turn secures gasket 17 therebetween and provides a seal around the lower annulus of rotameter tube 2.

Inlet conduit 19 in endplate 16 permits flow of fluid into rotameter tube 2 and outlet conduit 15 in endplate 12 provides the exit for fluid passed through rotameter tube 2. Inlet conduit 8 in headpiece element 7 permits flow of fluid to the annular space defined by rotameter tubes 1 and 2 and outlet conduit 20 in headpiece element 6 permits exit of fluid from the space between the two rotameter tubes.

Rotameter float 3 is freely slidable upon the outside surface of rotameter tube 2 and is preferably formed of glass, plastic or other transparent material, as are both rotameter tube 1 and rotameter tube 2. The inside face of rotameter float 3 is provided with calibration marks as shown at 5. For certain applications it may be desirable to form rotameter float 3 primarily of metal, such as aluminum, with calibrated transparent skirt affixed thereto in order that rotameter float 4 may be viewed therethrough.

Rotameter float 4 is provided within rotameter tube 2 and may be formed of any suitable material, preferably a material which is either opaque or translucent. It is found satisfactory in most instances to employ an aluminum rotameter float at 4, although for fluid density compensation for weight-rate rotameter, a float of special composition for specific float density is used.

If desired, one or both of the rotameter floats may be of the type described in the "Transactions of the American Institute of Chemical Engineers," December 25, 1940, page 857. The form of rotameter float described in this reference greatly minimizes the effects of viscosity and density of the fluids metered as factors in determining rotameter calibration.

In using the above described instrument, a first fluid, as for example air, is admitted through conducit 8 and passes out of the instrument through conduit 20, rotameter float 3 being raised to a level proportional to the flow of the air by the air stream through rotameter tube 1. A second fluid, as for example fuel, is admitted through conduit 19 and passes out through conduct 15, rotameter float 4 being raised to a level proportional to the flow rate of the fuel by the fuel passing through rotameter tube 2. The relative sizes of rotameter floats 3 and 4 and rotameter tubes 1 and 2 are such that during normal flow rates, the position of rotameter float 4 is always within the range of calibration marks 5. Thus, in utilizing the instrument for determining fuel-air ratios in the operation of fluid fuel burning engines, such as aircraft engines, the calibration marks on rotameter float 3 are experimentally determined and should preferably range from about 0.050 to about 0.15 for internal combustion engines, since, during normal operation, the air to fuel ratio employed in such engines usually ranges from 0.065 to 0.10 pound of fuel to each pound of air. With the calibration range mentioned above, it will be seen that the instrument automatically provides direct, continuous and instantaneous readings of the ratios of air to fuel being supplied to the engine during all normal operating conditions.

The design of the flow-ratio meter of the present invention permits calibration of the separate rotameter tubes for independent measurement of flow rate of the separate fluids. In this connection, graduation indicia on the transparent rotameter tubes 1 and 2 are inscribed on only a portion of the circumference of the tubes in order to obviate confusion of the scales. (See scales A and B of diagram.)

The present instrument is suitable for both naturally aspirated or supercharged engines, whether stationary laboratory test, automotive road test or aircraft engines. In this latter capacity the instrument is of great value in view of the marked trend towards operation of aircraft engines at their lowest specific fuel consumption during long flights, in order to further increase the cruising range of the aircraft. The engines are readily adjusted to the fuel-air ratio providing the desired economical engine operation when the aircraft is provided with one or more flow-ratio meters as described above.

It will be appreciated, of course, that the present instrument may be employed in any instrumentation wherein it is desired to determine the relative flow rates of two fluids, as for example in the operation and control of chemical plants, refineries and the like, and further, the instrument may be utilized to determine the flow ratio of a liquid with respect to a gas, as in the example described above, or the flow ratios of two liquids or two gases.

The invention claimed is:

1. In a flow-ratio meter the combination comprising a first rotameter tube, a second rotameter tube extending longitudinally within said first rotameter tube and defining an annular space between said rotameter tubes, a first annular rotameter float slidably mounted on said second rotameter tube and adapted to measure fluid flow through said annular space, a second rotameter float disposed in said second rotameter tube and adapted to measure fluid flow through said second rotameter tube and means including flow-ratio indicia operatively associated with said floats for indicating the ratio of said flows.

2. In a flow-ratio meter the combination comprising a first rotameter tube, a second rotameter tube extending longitudinally within said first rotameter tube and defining an annular space between said rotameter tubes, a first annular rotameter float formed of a transparent material and slidably mounted on said second rotameter tube adapted to measure fluid flow through said annular space, a second rotameter float disposed in said second rotameter tube and adapted to measure fluid flow through said second rotameter tube and flow-ratio indicia on at least one of said floats in registering relation with the other float.

3. In a flow-ratio meter the combination comprising a first rotameter tube, a second rotameter tube extending longitudinally within said first rotameter tube and defining an annular space between said rotameter tubes, a first annular rotameter float slidably mounted on said second rotameter tube and adapted to measure fluid flow through said annular space, said rotameter float being formed of a transparent material and provided with flow-ratio indicating indicia and a second rotameter float disposed in said second rotameter tube and adapted to measure fluid flow through said second rotameter tube, said second float cooperating with said indicia to indicate the ratio of said flows.

4. In a flow-ratio meter the combination comprising a first rotameter tube, a second rotameter tube extending longitudinally within said first rotameter tube and defining an annular space between said rotameter tubes, a first rotameter float slidably mounted on said second rotameter tube and adapted to measure fluid flow through said annular space, a second rotameter float disposed in said second rotameter tube and adapted to measure fluid flow through said second rotameter tube, headpiece elements abutting opposite ends of said first rotameter tube and forming a fluid-tight seal therewith, endplate elements secured to said headpiece elements and forming fluid-tight seals therewith, said endplate elements further abutting opposite ends of said second rotameter tube and forming fluid-tight seals therewith, fluid inlet conduit means in flow communication with the lower portion of said annular space, fluid outlet conduit means in flow communication with the upper portion of said annular space, fluid inlet conduit means in flow communication with the lower portion of said second rotameter tube and fluid outlet conduit means in flow communication with the upper portion of said second rotameter tube.

5. In a flow-ratio meter the combination comprising a first rotameter tube, a second rotameter tube extending longitudinally within said first rotameter tube and defining an annular space between said rotameter tubes, a first rotameter float slidably mounted on said second rotameter tube and adapted to measure fluid flow through said annular space, said rotameter float being formed of a transparent material and provided with flow-ratio indicating indicia, a second rotameter float disposed in said second rotameter tube and adapted to measure fluid flow through said second rotameter tube, headpiece elements abutting opposite ends of said first rotameter tube and forming a fluid-tight seal therewith, endplate elements secured to said headpiece elements and forming fluid-tight seals therewith, said endplate elements further abutting opposite ends of said second rotameter tube and forming fluid-tight seals therewith, fluid inlet conduit means in flow communication with the lower portion of said annular space, fluid outlet conduit means in flow communication with the upper portion of said annular space, fluid inlet conduit means in flow communication with the lower portion of said second rotameter tube and fluid outlet conduit means in flow communication with the upper portion of said second rotameter tube.

6. In a flow-ratio meter the combination comprising a first rotameter tube, a second rotameter tube extending longitudinally within said first rotameter tube and defining an annular space between said rotameter tubes, a first annular rotameter float slidably mounted on said second rotameter tube and adapted to measure fluid flow through said annular space, a second rotameter float disposed in said second rotameter tube and adapted to measure fluid flow through said second rotameter tube, flow-ratio indicia on at least one of said floats in registering relation with the other float, closure elements abutting opposite ends of both rotameter tubes and forming fluid-tight seals therewith, fluid inlet conduit means in flow communication with the lower portion of said annular space, fluid outlet conduit means in flow communication with the upper portion of said annular space, fluid inlet conduit means in flow communication with the lower portion of said second rotameter tube and fluid outlet conduit means in flow communication with the upper portion of said second rotameter tube.

7. In a flow-ratio meter the combination comprising a first rotameter tube, a second rotameter tube extending longitudinally within said first rotameter tube and defining an annular space between said rotameter tubes, a first annular rotameter float slidably mounted on said second rotameter tube and adapted to measure fluid flow through said annular space, said rotameter float being provided with flow-ratio indicating indicia, and a second rotameter float disposed in said second rotameter tube and adapted to measure fluid flow through said second rotameter tube, said second float cooperating with said indicia to indicate the ratio of said flows.

MILTON ERNEST SCHRAMM.

REFERENCES CITED

The following references are of record in the file of this patent:

UNITED STATES PATENTS

| Number | Name | Date |
| --- | --- | --- |
| 979,516 | Kuppers | Dec. 27, 1910 |
| 1,225,883 | Steinbart | May 15, 1917 |
| 1,947,923 | Schweitzer | Feb. 20, 1934 |
| 2,254,259 | Aller | Sept. 2, 1941 |
| 2,364,789 | Haywood | Dec. 12, 1944 |

FOREIGN PATENTS

| Number | Country | Date |
| --- | --- | --- |
| 162,874 | Great Britain | May 12, 1921 |